Dec. 19, 1961 P. A. TERRELL 3,013,332
SYSTEM FOR BANDING ORDNANCE SHELLS OR THE LIKE
Filed Aug. 2, 1957 2 Sheets-Sheet 1
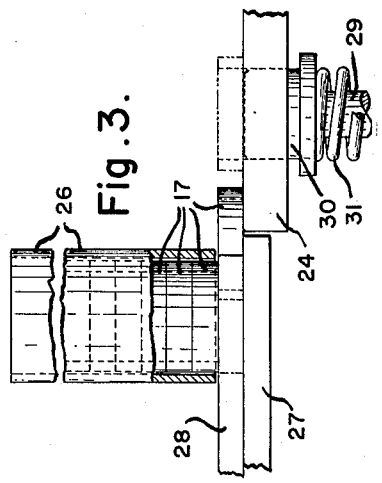
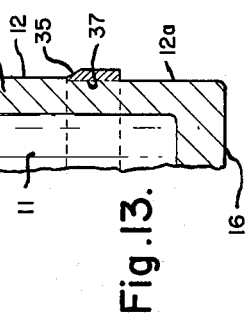
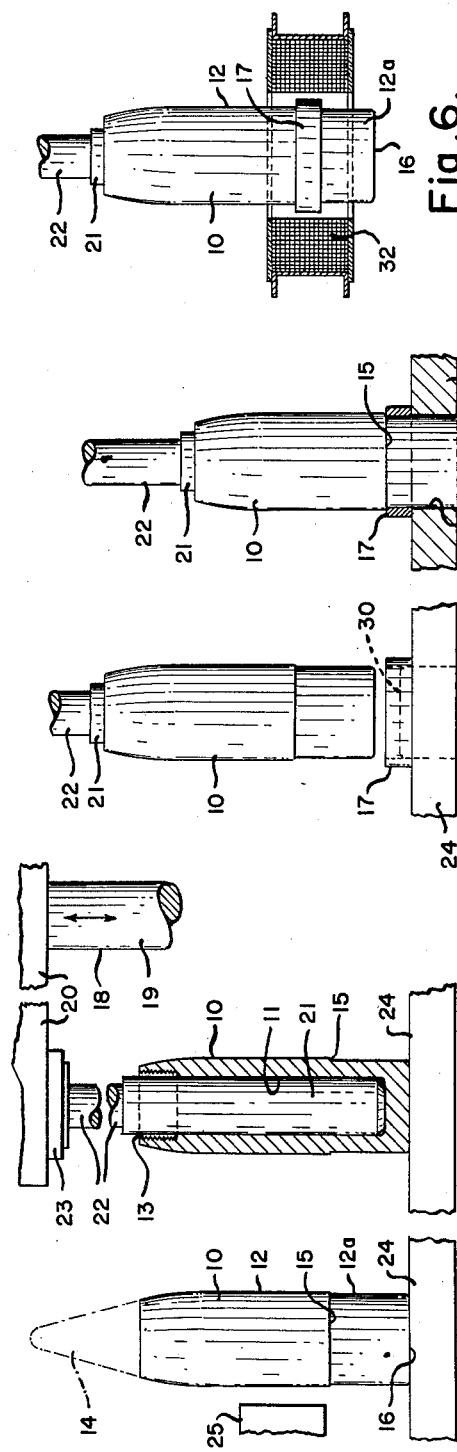
INVENTOR
Phillip A. Terrell Dec. 19, 1961  P. A. TERRELL  3,013,332
SYSTEM FOR BANDING ORDNANCE SHELLS OR THE LIKE
Filed Aug. 2, 1957  2 Sheets-Sheet 2

INVENTOR
Phillip A. Terrell

United States Patent Office 3,013,332
Patented Dec. 19, 1961

3,013,332
SYSTEM FOR BANDING ORDNANCE SHELLS OR THE LIKE
Phillip A. Terrell, Washington, D.C., assignor to Copperweld Steel Company, Pittsburgh, Pa., a corporation of Pennsylvania
Filed Aug. 2, 1957, Ser. No. 675,900
5 Claims. (Cl. 29—474.3)

This invention relates to a new system for banding ordnance shells or the like utilizing preformed banding rings of softer metal. More particularly, this invention pertains to a novel combination for banding shells or the like by direct bonding under selected conditions of temperature and pressure.

In the banding of ordnance shells to protect the rifling of guns and increase the accuracy of firing, it is a common practice to form an annular undercut groove in the body of the shell, ofttimes with the groove surface being knurled or roughened, to hold a band forced into such groove in a tight mechanical manner so that rotation will not occur between the band and the shell carrying it. With shells of smaller sizes, such as those used in 20 and 30 millimeter guns, the thickness of the shell wall must be greater than might otherwise be desired if an annular groove is to be formed therein for a band. As a consequence, efforts have been made more recently to weld a copper band on such smaller shells as by an arc overlay welding operation. However, in the case of such welding, machining must be resorted to to shape the band. This involves extra expense and effort and makes scrap metal out of a considerable portion of the banding metal originally applied. Other attempts have heretofore been made to try to join bands to shell bodies by brazing practices with unsatisfactory results.

Under the teachings of my invention, the difficulties and deficiencies of prior practices have been overcome. Thus, in this invention, preformed bands of softer metal like copper or bronze can be directly bonded to ordnance shells using temperature-pressure relationships disclosed herein. Further, such bonding may be provided without undercutting the shell body so that such shell body may be made with less metal therein resulting in substantial savings. Still further, in a practice of this invention, the shell body and band bonded thereto are not deformed and the system of this invention may be practiced by suitable machine tools in a continuous automatic or semi-automatic manner as desired.

Other objects, features and advantages of this invention will be apparent from the following description and from the accompanying drawings, which are a schematic illustration of one embodiment practice only, in which FIGURE 1 is a view of one form of hollow shell in an initial position for a forthcoming banding operation thereon under this invention;

FIGURE 2 is a view of the shell shown in FIGURE 1 gripped by a rotatable mandrel of a machine tool adapted to carry out such operation;

FIGURE 3 is a plan view of a preformed ring band in an initial position for a forthcoming operation of this invention;

FIGURE 4 is a view of a shell and band in superposed indexed position on the machine tool shown in FIGURE 2;

FIGURE 5 is a view of the work elements and apparatus at the station shown in FIGURE 4 with the band having been forced over the shell body to its predetermined banding position;

FIGURE 6 is a view of a further station in which the banded but unbonded shell is being heated to a selected temperature;

FIGURE 12 is a view of a banded shell with the band bonded to the shell body as provided by the illustrated practice of this invention; and FIGURE 13 is a view taken along line XIII—XIII of FIGURE 12.

Figure 7:
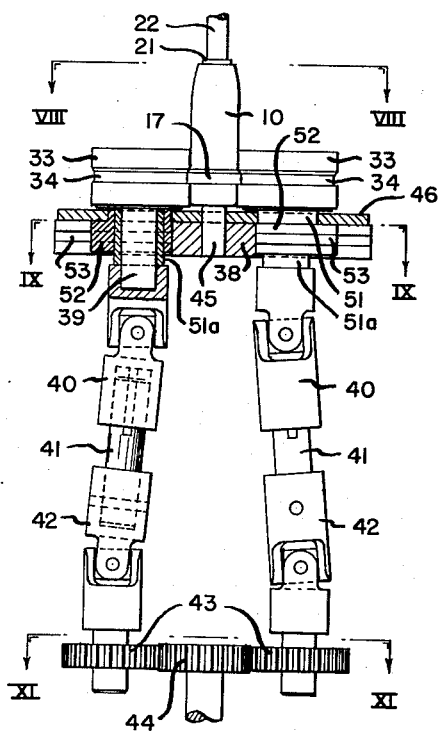
FIGURE 7 is a view of the next station of such machine tool during which the heated banded shell is being pressure rolled to complete the direct bonding of such band to such shell.

Referring to the drawings, a hollow shell body 10 may be provided having a cylindrical cavity 11 and a cylindrical exterior 12. Female threads 13 may be provided at the top of the cavity for the seating of a nosepiece 14, which may contain a fuse, after the shell 10 has been banded and an explosive charge placed in the cavity. As shown, exterior 12 is provided with a slight shoulder 15 facing the bottom 16 of the shell, a slightly reduced exterior portion 12a extending between bottom 16 and shoulder 15 for convenience merely as a stop when body 10 is united with a preformed ring band 17.

A machine tool 18 is shown in partial schematic form only, because many forms and varieties of machine tools may be used in various practices of this invention. Machine 18 provides for a continuous operation of the illustrated embodiment of my invention. Thus, a main shaft 19 in tool 18 has reciprocable vertical motion. Shaft 19 carries a head 20 having spider arms each of which advances by rotation of shaft 19 in timed sequence to successive stations surrounding the shaft 19. As shown, each spider arm is provided with an expandable mandrel 21 carried by a rotatable shaft 22 journaled in a bearing 23 on the respective arm of head 20. A supply of shells in appropriate alignment may be supported by gravity on an apron 24 and pushed by a horizontally reciprocable pusher 25 into the station position shown in FIGURE 2 when mandrel 21 is raised and contracted. Thereupon, mandrel 21 descends into cavity 11 and is expanded to grip the sides thereof without damage to threads 13 because of the crest diameter thereof. When the crest diameter of the threads 13 is less than the diameter of the smooth portion of cavity 11, mandrel 21 may be provided so as to be collapsible sufficiently to pass by said threads 13 during entry without touching them and would be provided of such length that when the mandrel was expanded in cavity 11, no part thereof would press on the threads 13.

From the station shown in FIGURE 2, head 20 is raised and swung so that the body of a shell 10 carried thereby is superposed over the next station shown in FIGURE 4 in coaxial relation to a preformed ring band 17. Successive ring bands are supplied through a feed tube 26 with the bottom-most resting on an apron 27 so that it can be slid into indexing position at the station of FIGURE 4 by a reciprocable feeder 28 shown in FIGURE 3. At the FIGURE 4 station, during such sliding of ring 17 into the position there shown, a rod 29 for an indexing block 30 is depressed as by a cam so that when the ring is in position and rod 29 released, a spring 31 will raise block 30 into the center of that ring 17 to accurately and coaxially center it relative to the shell 10 suspended above block 30.

In the next phase operation at the same station, shaft 19 and head 20 descend to force band 17 to slide over portion 12a until the upper edge of the band comes to rest against shoulder 15 as shown in FIGURE 5. As shell 10 descends, the bottom thereof passes into an opening 30a in table 24 which acts to force band 17 into such banding position. During that phase, an operative lever cam preferably is used to depress the mandrel shaft 22 below the level shown in other figures, the shaft 22 being in vertically movable relation to head 20 for that purpose and downward descent of rod 29 and block 30 is unimpeded except by the resistance of spring 31. Although a shoulder 15 is provided in the illustrated shell form shown, no such shouldering is required because the distance through which the part of machine 18 are designed to move are precise enough to move band 17 to its selected banding position on the exterior 12 even though there were no reduced cylindrical portion 12a thereof.

Preferably before a shell body 10 is engaged by a machine like machine 18, the portion thereof to be contacted by a band 17 is metallurgically clean. Likewise, a band 17 moved into the station shown in FIGURE 4 is also metallurgically clean. Such cleaning may be done by conventional pickling, or by other methods, and preferably takes place shortly before the respective shell and band work elements are mechanical moved into their assembly positions. The size of the band 17 in a particular operation is selected to match the size of the respective shells 10 processed in that operation. Preferably that fit is sufficiently close so that upon the completion of the phase shown in FIGURE 5, a metallurgically clean interface surface exists between band 17 and the portion 12a lying therebeneath.

In the next phase, the banded but unbonded shell 10 is moved from the station shown in FIGURES 4 and 5 to a close by following station wherein the assembled work elements are positioned in an induction heating coil 32 which rapidly heats a band 17 therein and the interface portion of surface 12a in the accompanying shell body 10 to a temperature in the neighborhood of a temperature ranging from about 1800° F. to a temperature about but below the melting point temperature of band 17. Band 17 preferably is made of copper, although bronze and other relatively "soft" metals may be used.

In the phase next following the heating phase of FIGURE 6, the heated assembled work elements 10 and 17 are raised, swung and lowered into the indexing position shown at the station illustrated in FIGURE 7 where a cluster of pressure rolls 33 complete the bonding of band 17 to that part of exterior portion 12a forming an interface with the inside of band 17. Such pressure rolls are provided with an annular shaping groove 34 which completes such bonding to directly weld band 17 to shell 10 and may also provide, as shown, a chamfer 35 at the leading edge of band 17, although any such chamfer is preferably also preformed before a band 17 is assembled with a shell 10. During such pressure rolling, shaft 22, which is not power-driven, is rotated by the action of driven rolls 33 to apply a predetermined rolling pressure uniformly about the axis of work elements 10 and 17. Such pressure and rolling cause no deformation of the shell 10 and any shaping of band 17 desired to be obtained is symmetrical and uniform. When the pressure rolls 33 are moved apart following such rolling, shaft 19 is raised and head 20 rotated so that the completed assembled and bonded banded shell 36 can be released by a collapse and withdrawal of the holding mandrel 21, leaving band and shell directly pressure welded to one another at interface 37.

At the station shown in FIGURE 7, each roll 33 in the roll cluster has a lower roll neck 39 pinned to one part of a universal coupling 40. The lower part of coupling 40 is in splined engagement with a driving shaft 41 which is connected in turn to a second universal coupling 42. The lower part of coupling 42 is connected to a planetary drive gear 43. All of the planetary drive gears 43 are driven in synchronism by a driving pinion 44, the rotation of which is in timed sequence relative to the arrival and positioning of the work elements 10 and 17 at the FIGURE 7 station.

Figure 8:
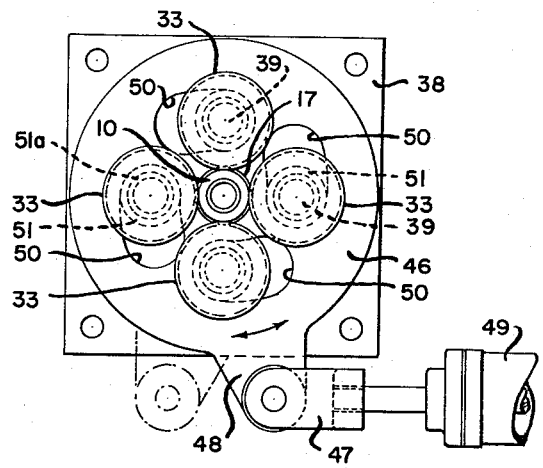
FIGURE 8 is a view of the machine tool at the pressure roller station of FIGURE 7 taken along line VIII—VIII of FIGURE 7.
Figure 9:
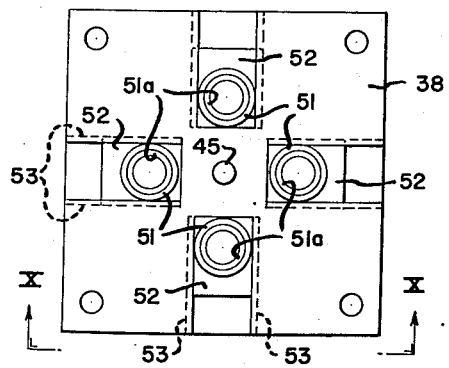
FIGURE 9 is a view at the same station taken along line IX—IX of FIGURE 7.
Figure 11:
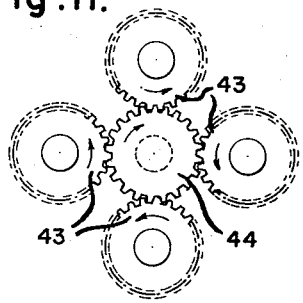
FIGURE 11 is a view taken along line XI—XI of FIGURE 7.
Figure 10:
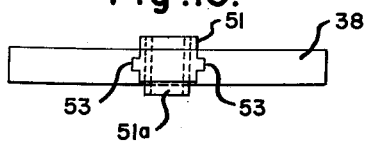
FIGURE 10 is a view taken along line X—X of FIGURE 9.

At the FIGURE 7 station, a fixed table 38 is provided having an upstanding pivot 45 in coaxial relation to an assembled band and shell which may be suspended above pivot 45 or rotatably rest on the top thereof. A cam plate 46 is supported on table 38 and is made rotatable about pivot 45 in accordance with movements of a clevis 47 pivotally connected to a lug 48 on the edge of plate 46. Clevis 47 is reciprocated at the appropriate times and in the appropriate sequence of a cylinder 49 connected to the control system for machine 18. Skewed cam openings 50 are provided in uniform arrangement around the vertical axis thereof, such openings 50 engaging a cylindrical flange 51 having a bushing 51a therein surrounding a roll neck 39 passing therethrough. Because of the skewing of such openings 50, as shown in FIGURE 8, the rotation thereof in a clockwise direction from the position shown in FIGURE 8 will force the rolls 33 outwardly away from the work assembled elements 10 and 17, so that the bonded banded shell 36 can be removed and a new assembly from the station of FIGURE 6 can be positioned in pressure rolling position.

As cam plate 46 is rotated, a radially movable slide 52 also moves in the opposed ways 53 in table 38. Each of the slides 52 is provided with an integral cylindrical flange 51 which extends into its respective opening 50 between neck 39 and bushing 51a. After a heated assembly arrives in the position shown in FIGURE 7, cam plate 46 is rotated in a counterclockwise direction under the control of cylinder 49 causing the mandrel shaft 22 concerned to rotate as the turning rolls 33 apply pressure to complete the bonding and shape band 17 as aforesaid.

Pressure utilized to bond a steel shell 10 with a copper band 17 thereon will vary generally inversely with temperature to which the work elements are raised in the phase of FIGURE 6. With shells of lighter weight and section such as shells for smaller guns, the higher temperature-lower pressure bonding condition relation is preferred. By way of example only, and without limitation thereto, the following demonstration results using a fully preformed band provide good bonds without shell or band deformation:

| Example | Body Material | Band Material | Temperature, °F. | Pressure (p.s.i.g.) |
| --- | --- | --- | --- | --- |
| I | mild steel | copper | 1,950 | 150 |
| II | do | do | 1,900 | 250 |
| III | do | do | 1,850 | 875 |
| IV | do | do | 1,800 | 1,100 |

In connection with such examples, it may also be noted that the completion of the bonding by such pressure rolling upon the heated work elements will take place substantially upon the attainment of the preselected pressure. Thus, by means of my new system, copper or bronze bands can be successfully directly welded to shells and shell bodies without grooving or undercutting the shell body and in a continuous operation which does not require finish machining.

Although in the illustrated embodiment a cluster of unheated pressure rolls is shown it will be evident that such rolls may be preheated to a predetermined temperature if desired to inhibit heat loss during the pressure rolling action. Further, it will be realized that non-rolling pressure dies may be utilized in some practices hereunder to clamp the ring band to a shell body at a selected pressure-temperature condition to complete the bonding between those work elements. Still further, no provision has been made in the illustrated embodiment for the conducting of the phase steps in a protective, that is, in a non-oxidizing or non-scaling atmosphere, but such a protective atmosphere may be furnished underneath a hood, for example, covering the entire machine, particularly where it may be desired, as with metal sections of greater thickness, to have an intermediate step for the preheating

I claim:

1. In a continuous system for banding ordnance shells or the like, the steps comprising, in combination, gripping the interior of an unbanded preformed hollow steel shell or the like, positioning a preformed cuprous ring band in coaxial juxtaposition to said shell, forcing said band axially and relatively over said shell to a selected banding position on said shell having an outside diameter substantially equal to the inside diameter of said band, heating said shell and band to a temperature in the neighborhood of a temperature in a range extending from about 1800° F. to a temperature about 1950° F., and pressing said band substantially radially only and relatively against said shell at a pressure varying inversely with temperature in the neighborhood of a pressure in a range extending from about 1100 pounds per square inch to about 150 pounds per square inch, whereby said band is pressure welded directly to said shell without deformation of said shell and band.

2. In a system for banding ordnance shells or the like, the steps comprising, in combination, holding an unbanded preformed hollow steel shell or the like, positioning a preformed copper ring band in selected banding position on said shell having an outside diameter substantially equal to the inside diameter of said band, heating at least the interface between said shell and band to a temperature in the neighborhood of 1900° F. and pressing said band substantially uniformly and radially only against said shell at a pressure in the neighborhood of 250 pounds per square inch gauge for the period of time required to reach such pressure and pressure weld said band directly to said shell.

3. In a system for banding ordnance shells or the like, the steps comprising, in combination, holding an unbanded preformed hollow steel shell or the like, positioning a preformed copper ring band in selected banding position on said shell having an outside diameter substantially equal to the inside diameter of said band, heating at least the interface between said shell and band to a temperature in the neighborhood of 1800° F. and pressing said band substantially uniformly and radially only against said shell at a pressure in the neighborhood of 875 pounds per square inch gauge for the period of time required to reach such pressure and pressure weld said band directly to said shell.

4. In a continuous system for banding ordnance shells or the like, the steps comprising, in combination, supporting the bottom of an unbalanced preformed hollow steel shell or the like having a band receiving area, gripping the interior of said shell, preheating at least the exterior of said hollow shell in said band receiving area thereof, preheating a preformed endless cupreous band having an internal diameter substantially equal to the external diameter of said band receiving area, positioning said shell and band in superposed relation, forcing said band axially and relatively over said shell until it reaches said band receiving area, further heating said shell and band to a temperature in the neighborhood of but below the melting point of said band, and rotating said shell and band together substantially at said last-named temperature while relatively roll pressing said band substantially radially only against said shell until said band is metallurgically bonded directly to said shell, said steps other than said forcing being performed at respectively different station locations.

5. In a continuous system for banding ordnance shells or the like, the steps comprising, in combination, gripping an unbanded preformed hollow steel shell or the like through its open top, the banding exterior portion of said shell being in clean, oxide-free condition, positioning a preformed cupreous ring band to fit said shell in coaxial juxtaposition to said shell, the interior of said band being in clean, oxide-free condition and having a diameter substantially equal to the diameter of said banding exterior portion, pressing said shell and band relatively axially toward one another to move said band in contact with and over the exterior of said shell to a predetermined banding position, heating said band and the adjacent portion of said shell to a temperature in the neighborhood of but below the melting point of said band, and sufficiently pressing said band relatively and radially only against said shell at about said temperature without deformation of either to metallurgically bond the two directly together.

References Cited in the file of this patent

UNITED STATES PATENTS

| | | |
|---|---|---|
| 930,863 | Kearney | Aug. 10, 1909 |
| 2,177,435 | Kretz | Oct. 24, 1939 |
| 2,353,008 | Bondeson | July 4, 1944 |
| 2,406,392 | Minarik et al. | Aug. 27, 1946 |
| 2,775,029 | Bennett et al. | Dec. 25, 1956 |

FOREIGN PATENTS

| | | |
|---|---|---|
| 399,451 | Italy | Oct. 27, 1942 |

UNITED STATES PATENT OFFICE
CERTIFICATE OF CORRECTION

Patent No. 3,013,332                      December 19, 1961

Phillip A. Terrell

It is hereby certified that error appears in the above numbered patent requiring correction and that the said Letters Patent should read as corrected below.

Column 3, line 12, for "part" read -- parts --; column 5, line 11, for "cuprous" read -- cupreous --; column 6, line 3, for "unbalanced" read -- unbanded --.

Signed and sealed this 12th day of June 1962.

(SEAL)
Attest:

ERNEST W. SWIDER
Attesting Officer

DAVID L. LADD
Commissioner of Patents